US011942297B2

(12) United States Patent
Kawaguchi et al.

(10) Patent No.: US 11,942,297 B2
(45) Date of Patent: Mar. 26, 2024

(54) RELAY

(71) Applicant: OMRON Corporation, Kyoto (JP)

(72) Inventors: Naoki Kawaguchi, Yame (JP); Ryota Minowa, Yamaga (JP); Yasuo Hayashida, Kumamoto (JP); Shingo Mori, Yamaga (JP); Kohei Otsuka, Omuta (JP); Hiroyuki Iwasaka, Kumamoto (JP)

(73) Assignee: OMRON CORPORATION, Kyoto (JP)

( * ) Notice: Subject to any disclaimer, the term of this patent is extended or adjusted under 35 U.S.C. 154(b) by 575 days.

(21) Appl. No.: 17/262,219

(22) PCT Filed: Feb. 18, 2019

(86) PCT No.: PCT/JP2019/005925
§ 371 (c)(1),
(2) Date: Jan. 22, 2021

(87) PCT Pub. No.: WO2020/039614
PCT Pub. Date: Feb. 27, 2020

(65) Prior Publication Data

US 2021/0296070 A1 Sep. 23, 2021

(30) Foreign Application Priority Data

Aug. 24, 2018 (JP) ................................ 2018-157816

(51) Int. Cl.
*H01H 9/30* (2006.01)
*H01H 50/14* (2006.01)
(Continued)

(52) U.S. Cl.
CPC .............. *H01H 50/58* (2013.01); *H01H 9/30* (2013.01); *H01H 50/14* (2013.01); *H01H 50/18* (2013.01); *H01H 50/44* (2013.01)

(58) Field of Classification Search
CPC ........ H01H 50/58; H01H 50/14; H01H 50/18; H01H 50/44; H01H 50/546; H01H 9/30;
(Continued)

(56) References Cited

U.S. PATENT DOCUMENTS 6,075,429 A * 6/2000 Uotome ................. H01H 9/443 335/130
8,222,980 B2 * 7/2012 Yamagata ................ H01H 1/66 335/133
(Continued)

FOREIGN PATENT DOCUMENTS

JP 2013-84425 A 5/2013
JP 2013-98051 A 5/2013
(Continued)

OTHER PUBLICATIONS

The International Search Report of International Application No. PCT/JP2019/005925 dated May 21, 2019.
(Continued)

*Primary Examiner* — William A Bolton
(74) *Attorney, Agent, or Firm* — SHINJYU GLOBAL IP

(57) ABSTRACT

A relay includes a movable contact piece having a movable contact, a fixed contact, a drive device configured to move the movable contact piece, a magnet to apply a Lorentz force to an arc in a first extension direction, a fixed terminal having an intermediate portion to apply a Lorentz force to the arc in a second extension direction, and a wall portion. The wall portion includes first and second wall surfaces. The first wall surface is disposed to face an arc-extinguishing space, and is disposed opposite to the movable contact and the fixed contact in the first extension direction. The second wall surface is disposed to face the arc-extinguishing space and is disposed downstream in the second extension direction with respect to the first wall surface. A distance from the
(Continued)

movable contact piece to the second wall surface differs from a distance to the first wall surface.

9 Claims, 15 Drawing Sheets

(51) Int. Cl.
*H01H 50/18* (2006.01)
*H01H 50/44* (2006.01)
*H01H 50/58* (2006.01)

(58) Field of Classification Search
CPC ................. H01H 9/443; H01H 50/026; H01H 2050/028; H01H 51/00
USPC ....................... 200/283, 243, 244; 218/31, 30
See application file for complete search history.

(56) References Cited

U.S. PATENT DOCUMENTS

| | | | | |
|---|---|---|---|---|
| 8,653,917 | B2 * | 2/2014 | Takaya | H01H 9/443 335/131 |
| 9,412,545 | B2 * | 8/2016 | Kubono | H01H 50/60 |
| 9,589,739 | B2 * | 3/2017 | Naka | H01H 33/60 |
| 9,673,008 | B2 * | 6/2017 | Tachikawa | H01H 50/58 |
| 9,887,056 | B2 * | 2/2018 | Lee | H01H 49/00 |
| 2013/0057369 | A1 | 3/2013 | Yano et al. | |
| 2013/0057377 | A1 | 3/2013 | Yano et al. | |
| 2013/0076464 | A1 | 3/2013 | Yano et al. | |
| 2013/0088311 | A1 | 4/2013 | Yano et al. | |
| 2013/0099880 | A1 | 4/2013 | Yano et al. | |
| 2013/0106542 | A1 | 5/2013 | Yano et al. | |
| 2013/0106543 | A1 | 5/2013 | Isozaki et al. | |
| 2013/0207753 | A1 | 8/2013 | Yano et al. | |
| 2013/0214883 | A1 | 8/2013 | Yano et al. | |
| 2013/0257568 | A1 | 10/2013 | Yano et al. | |
| 2015/0048908 | A1 | 2/2015 | Isozaki et al. | |
| 2017/0365431 | A1 * | 12/2017 | Sakai | H01H 50/20 |

FOREIGN PATENT DOCUMENTS

| | | |
|---|---|---|
| JP | 2017-117678 A | 6/2017 |
| WO | 2011115057 A1 | 9/2011 |

OTHER PUBLICATIONS

The Written Opinion of the International Searching Authority of International Application No. PCT/JP2019/005925 dated May 21, 2019.

* cited by examiner

RELAY

CROSS-REFERENCE TO RELATED APPLICATION

This application is the U.S. National Phase of International Application No. PCT/JP2019/005925, filed on Feb. 18, 2019. This application claims priority to Japanese Patent Application No. 2018-157816, filed Aug. 24, 2018. The contents of that application are incorporated by reference herein in their entireties.

FIELD

The present invention relates to a relay.

BACKGROUND

Some relays are equipped with a magnet for extinguishing an arc that occurs at contact points. For example, in Japanese Patent Application Publication No. 2013-98051A, two magnets are arranged so as to mutually oppose each other in the width direction of a movable contact piece. The movable contact piece is arranged between the two magnets. When an arc is generated between the contact points, a Lorentz force acts on the arc due to the magnetic force of the magnets. Thereby, the arc is extinguished as a result of the arc being stretched into the space lateral to the movable contact piece.

SUMMARY

On the other hand, in some relays, the behavior of an arc is affected by the self-magnetic field generated by an electric current flowing through the fixed terminal. For example, FIG. 15A is a plan view showing a contact point device of a relay according to a related technique. In this relay, a magnet 300 generates a magnetic flux at a contact position P10 heading to the outer side in the longitudinal direction of a movable contact piece 100 as shown by the arrow B10. Accordingly, when an electric current 110 flows in the direction perpendicular to the paper surface of FIG. 15A at the contact position P10, a Lorentz force in the width direction of the movable contact piece 100 acts on the arc as shown by the arrow F10. Thereby, the arc is stretched into the space lateral to the movable contact piece 100.

However, in the relay shown in FIG. 15A, a portion 201 of the fixed terminal 200 is arranged on the outer side of the contact position P10. This portion 201 extends in a direction perpendicular to the paper surface of FIG. 15A. Accordingly, when an electric current 120 flows through this portion 201, a magnetic flux is generated in the width direction of the movable contact piece 100 at the contact position P10 as shown by the arrow B20. Due to this magnetic flux, a Lorentz force F20 heading to the inner side in the longitudinal direction of the movable contact piece 100 is generated at the arc. Accordingly, a resultant force F30 of the Lorentz force F10 due to the magnetic force of the magnet 300 and the Lorentz force F20 due to the electric current flowing through the fixed terminal 200 acts on the arc. Therefore, the arc is extinguished by being stretched in the direction of the resultant force F30.

Here, in order to suitably extinguish an arc, it is important to appropriately set the distance between the starting point of the arc and a wall portion arranged on the side of the movable contact piece. For example, when the distance between the starting point of the arc and the wall portion is small, the space for stretching the arc becomes narrow. For that reason, it becomes difficult to sufficiently stretch the arc. Further, when the distance between the starting point of the arc and the wall portion is large, the force for pressing the arc against the wall portion becomes weak. For that reason, it becomes difficult to sufficiently extinguish the arc. Accordingly, the arc can be suitably extinguished by appropriately setting the distance between the starting point of the arc and the wall portion in the direction in which the arc is stretched.

However, as described above, when the behavior of the arc is affected by the self-magnetic field arising from the electric current flowing through the fixed terminal, the magnitude of the Lorentz force F20 heading to the inner side in the longitudinal direction of the movable contact piece 100 changes in accordance with the magnitude of the electric current. Therefore, the direction in which the arc is stretched changes by a change in the direction of the resultant force F30 of the Lorentz forces.

For example, as shown in FIG. 15B, the direction of the resultant force F30 of the Lorentz forces when the electric current value is 100 A is different from the direction of the resultant force F30' of the Lorentz forces when the electric current value is 3,000A. Therefore, the direction in which the arc is stretched differs between when the electric current value is 100 A and when the electric current value is 3,000 A. Accordingly, as shown in FIG. 15B, when the distance between the movable contact piece 100 and the wall portion 400 is constant, it is difficult to appropriately extinguish an arc in accordance with the magnitude of the electric current.

An object of the present invention is to appropriately secure the arc-extinguishing ability of a relay according to the magnitude of an electric current flowing through the contacts.

A relay according to one aspect includes a movable contact piece, a fixed contact, a drive device, a magnet for arc extinguishing, a fixed terminal, and a wall portion. The movable contact piece includes a movable contact. The fixed contact is arranged opposite the movable contact. The drive device moves the movable contact piece in a direction in which the movable contact makes contact with the fixed contact and in a direction in which the movable contact is separated therefrom. The magnet for arc extinguishing is arranged so as to apply a Lorentz force in a first extension direction to an arc generated between the movable contact and the fixed contact. The fixed terminal includes a contact support portion and an intermediate portion. The fixed contact is mounted in the contact support portion. The intermediate portion applies a Lorentz force to the arc in a second extension direction different from the first extension direction when an electric current flows through the intermediate portion. The wall portion is arranged separated from the movable contact piece in the first extension direction by an arc-extinguishing space.

The wall portion includes a first wall surface and a second wall surface. The first wall surface is arranged facing the arc-extinguishing space, and is arranged opposite the first extension direction with respect to the movable contact and the fixed contact. The second wall surface is arranged facing the arc-extinguishing space, and arranged in the second extension direction with respect to the first wall surface. The distance from the movable contact piece to the second wall surface differs from the distance from the movable contact piece to the first wall surface.

In the relay according to the present aspect, when the electric current flowing through the contacts is small, the arc is stretched toward the first wall surface. Also, when the electric current flowing through the contacts is large, the arc is stretched toward the second wall surface. The distance from the movable contact piece to the second wall surface is different from the distance from the movable contact piece to the first wall surface. Accordingly, the arc can be appropriately extinguished by appropriately setting the distance from the movable contact piece to the second wall surface and the distance from the movable contact piece to the first wall surface according to the difference in the magnitude of the electric current. Thereby, in the relay according to this aspect, it is possible to appropriately secure the arc-extinguishing ability according to the magnitude of the electric current flowing through the contacts.

The distance from the movable contact piece to the second wall surface may be larger than the distance from the movable contact piece to the first wall surface. In this case, when the electric current is large, a space sufficiently large for stretching the arc can be secured between the second wall surface and the movable contact piece.

The wall portion may include a connecting wall surface arranged between the first wall surface and the second wall surface. The distance from the movable contact piece to the connecting wall surface may be smaller than the distance from the movable contact piece to the second wall surface and may be larger than the distance from the movable contact piece to the first wall surface. In this case, when the arc is stretched between the first wall surface and the second wall surface, the arc can be appropriately extinguished.

The connecting wall surface may be inclined so that the distance from the movable contact piece increases toward the second extension direction. In this case, when the arc is stretched between the first wall surface and the second wall surface, the arc can be appropriately extinguished.

The distance from the movable contact piece to the second wall surface may be smaller than the distance from the movable contact piece to the first wall surface. In this case, when the electric current is large but the voltage is small, the stretched arc can be pressed against the second wall surface with sufficient force. Thereby, the arc can be appropriately extinguished.

The wall portion may include a connecting wall surface arranged between the first wall surface and the second wall surface. The distance from the movable contact piece to the connecting wall surface may be larger than the distance from the movable contact piece to the second wall surface and smaller than the distance from the movable contact piece to the first wall surface. In this case, when the arc is stretched between the first wall surface and the second wall surface, the arc can be appropriately extinguished.

The connecting wall surface may be inclined so that the distance from the movable contact piece decreases toward the second extension direction. In this case, when the arc is stretched between the first wall surface and the second wall surface, the arc can be appropriately extinguished.

The first movable contact and the second movable contact may be arranged apart from each other in the longitudinal direction of the movable contact piece. The magnet may be arranged so as to generate a magnetic flux between the movable contact and the fixed contact in a direction heading to the outer side of the movable contact piece in the longitudinal direction. The intermediate portion may be arranged on the outer side of the fixed contact in the longitudinal direction and may extend in the moving direction of the movable contact piece. In this case, the resultant force of the Lorentz force in the width direction of the movable contact piece intersecting in the longitudinal direction of the movable contact piece and the Lorentz force in the direction heading to the inner side of the movable contact piece in the longitudinal direction acts on the arc. Then, as the electric current increases, the direction in which the arc is stretched changes heading to the inner side of the movable contact piece in the longitudinal direction.

The first extension direction may be the width direction of the movable contact piece intersecting the longitudinal direction of the movable contact piece. The second extension direction may be a direction heading to the inner side of the movable contact piece in the longitudinal direction. In this case, the resultant force of the Lorentz force in the width direction of the movable contact piece intersecting the longitudinal direction of the movable contact piece and the Lorentz force in the direction heading to the inner side of the movable contact piece in the longitudinal direction acts on the arc. Then, as the electric current increases, the direction in which the arc is stretched changes heading to the inner side of the movable contact piece in the longitudinal direction.

The relay may further include a contact case for housing the movable contact piece and the fixed contact. The wall portion may be separate from the contact case. In this case, the formation of the wall portion becomes easy.

The wall portion may be formed of an arc-extinguishing material that generates an arc-extinguishing gas by the heat of the arc. In this case, the arc can be extinguished more appropriately.

DETAILED DESCRIPTION

Figure 1:
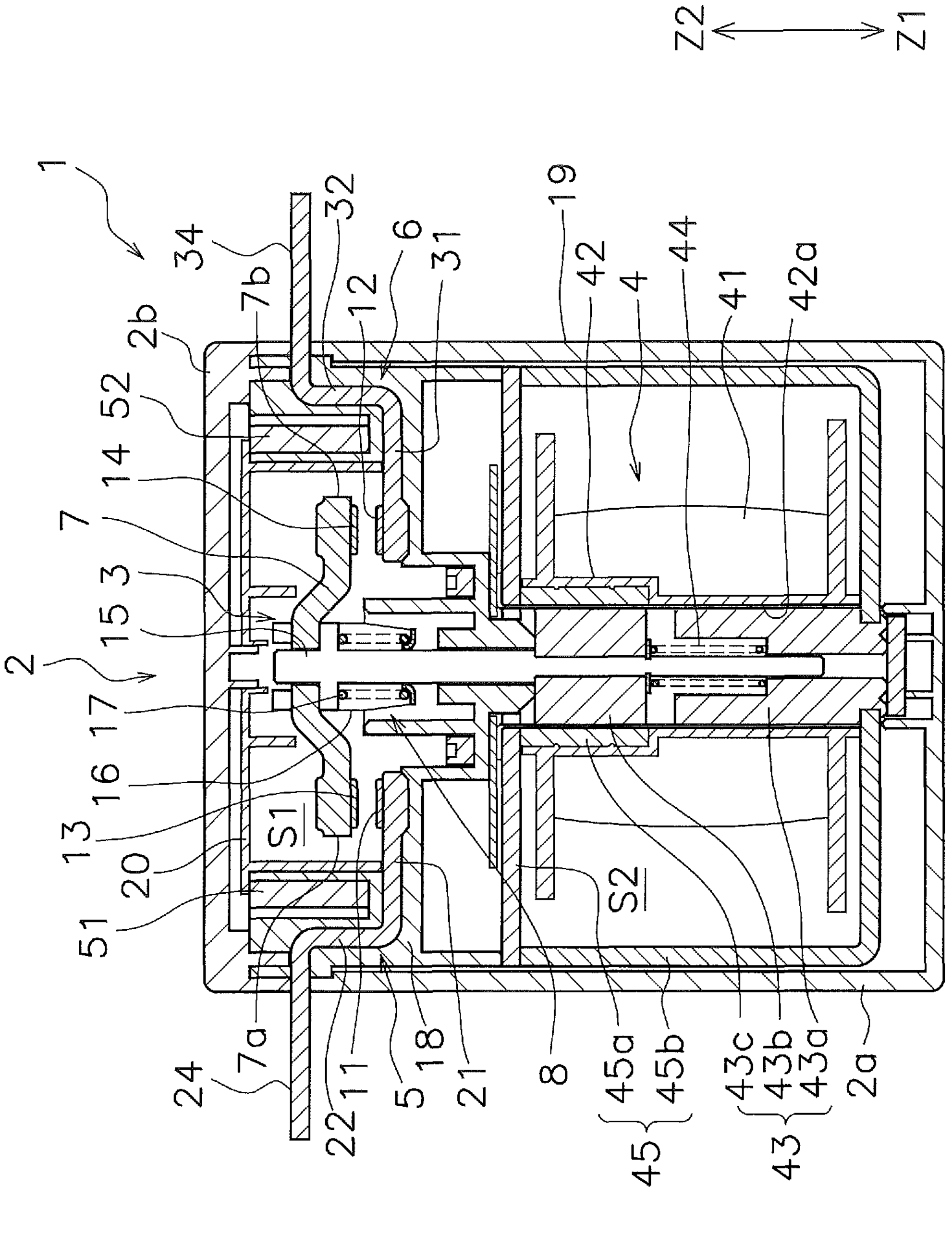
FIG. 1 is a side sectional view showing a relay according to an embodiment.

Hereinbelow, a relay according to the embodiment will be described with reference to the drawings. FIG. 1 is a side sectional view showing a relay 1 according to the first embodiment. As shown in FIG. 1, the relay 1 includes a case 2, a contact device 3, and a drive device 4. In the following description, each direction of up/down/left/right respectively means up/down/left/right in FIG. 1. Further, the front-back direction is assumed to mean a direction perpendicular to the paper surface of FIG. 1. However, the definitions of these directions do not limit the arrangement direction of the relay 1.

The case 2 houses the contact device 3 and the drive device 4. The case 2 is made of an insulating resin. The case 2 includes a case body 2*a* and a lid 2*b*. The contact device 3 and the drive device 4 are arranged in the case body 2*a*. The lid 2*b* is separate from the case body 2*a*. The lid 2*b* is attached to the case body 2*a*.

The case body 2*a* includes a contact case 18, an outer case 19, and an inner case 20. In the contact case 18, the inside of the case 2 is divided into a first storage portion S1 and a second storage portion S2. The contact device 3 is arranged in the first storage portion S1. The drive device 4 is arranged in the second storage portion S2. The outer case 19 houses the contact case 18 inside. The inner case 20 is attached to the contact case 18. The inner case 20 will be described in detail later.

The contact device 3 includes a first fixed terminal 5, a second fixed terminal 6, a movable contact piece 7, and a contact piece holder 8. The first fixed terminal 5, the second fixed terminal 6, and the movable contact piece 7 are formed of a conductive material such as copper. The first fixed terminal 5 includes a first fixed contact 11. The second fixed terminal 6 includes a second fixed contact 12. The first fixed contact 11 and the second fixed contact 12 are arranged apart from each other in the left-right direction.

The movable contact piece 7 extends in the left-right direction. In the present embodiment, the longitudinal direction of the movable contact piece 7 coincides with the left-right direction. The movable contact piece 7 includes a first movable contact 13 and a second movable contact 14. The first movable contact 13 and the second movable contact 14 are arranged apart from each other in the left-right direction. The first movable contact 13 is arranged opposite the first fixed contact 11. The second movable contact 14 is arranged opposite the second fixed contact 12.

The movable contact piece 7 includes a first end portion 7*a* and a second end portion 7*b*. The first end portion 7*a* is one end portion of the movable contact piece 7 in the left-right direction. The second end portion 7*b* is the other end portion of the movable contact piece 7 in the left-right direction. In the present embodiment, the first end portion 7*a* is the left end portion of the movable contact piece 7. The second end portion 7*b* is the right end portion of the movable contact piece 7. The first movable contact 13 is arranged between the center of the movable contact piece 7 in the left-right direction and the first end portion 7*a*. The second movable contact 14 is arranged between the center of the movable contact piece 7 in the left-right direction and the second end portion 7*b*.

The movable contact piece 7 is arranged so as to be movable in the up-down direction. Specifically, the movable contact piece 7 is arranged to be movable in a contact direction Z1 and a separating direction Z2. The contact direction Z1 is the direction in which the first movable contact 13 and the second movable contact 14 come into contact with the first fixed contact 11 and the second fixed contact 12 (downward in FIG. 1). The separating direction Z2 is the direction in which the first movable contact 13 and the second movable contact 14 are separated from the first fixed contact 11 and the second fixed contact 12 (upward in FIG. 1).

The contact piece holder 8 holds the movable contact piece 7. The contact piece holder 8 holds the movable contact piece 7 at the center of the movable contact piece 7 in the left-right direction. The contact piece holder 8 includes a drive shaft 15, a holder 16, and a contact spring 17. The drive shaft 15 extends in the up-down direction. The drive shaft 15 connects the movable contact piece 7 and the drive device 4. The drive shaft 15 is movably arranged in the contact direction Z1 and the separating direction Z2. The holder 16 is connected to the movable contact piece 7 and holds the movable contact piece 7. The contact spring 17 is arranged between the drive shaft 15 and the holder 16. The drive shaft 15 is connected to the holder 16 via the contact spring 17.

The first fixed terminal 5 includes a first contact support portion 21, a first intermediate portion 22, and a first external connection portion 24. The first fixed contact 11 is provided in the first contact support portion 21. The first contact support portion 21 extends from the first fixed contact 11 to the outer side in the left-right direction. Note that outer side in the left-right direction means a direction away from the central axis of the drive shaft 15 in the left-right direction. Inner side in the left-right direction means a direction approaching the central axis of the drive shaft 15 in the left-right direction.

The first intermediate portion 22 is located between the first contact support portion 21 and the first external connection portion 24. The first intermediate portion 22 is arranged on the outer side of the first fixed contact 11 in the longitudinal direction of the movable contact piece 7. The first intermediate portion 22 extends from the first contact support portion 21 in a direction parallel to the moving direction of the movable contact piece 7, that is, in the up-down direction. Specifically, the first intermediate portion 22 extends upward from the first contact support portion 21. The first external connection portion 24 extends to the left from the first intermediate portion 22. The first external connection portion 24 projects to the outer side of the case 2.

The first fixed terminal 5 has a bent shape between the first contact support portion 21 and the first intermediate portion 22 and between the first intermediate portion 22 and the first external connection portion 24. The first contact support portion 21, the first intermediate portion 22, and the first external connection portion 24 may be integrally formed. Alternatively, the first contact support portion 21, the first intermediate portion 22, and the first external connection portion 24 may be separate bodies from each other and connected to each other by a fixing means such as welding.

The second fixed terminal 6 includes a second contact support portion 31, a second intermediate portion 32, and a second external connection portion 34. The second fixed contact 12 is provided in the second contact support portion 31. The second fixed terminal 6 has a shape that is left-right symmetrical with the first fixed terminal 5. The second contact support portion 31, the second intermediate portion 32, and the second external connection portion 34 correspond to the first contact support portion 21, the first intermediate portion 22, and the first external connection portion 24, respectively. Accordingly, a detailed description of the second fixed terminal 6 will be omitted.

The drive device 4 generates a driving force for operating the movable contact piece 7. The drive device 4 operates the movable contact piece 7 by an electromagnetic force. The drive device 4 moves the movable contact piece 7 in the contact direction Z1 and the separating direction Z2. The drive device 4 is arranged below the movable contact piece 7. The drive device 4 includes a coil 41, a spool 42, an iron core 43, a return spring 44, and a yoke 45.

The coil 41 is wound around the spool 42. The coil 41 and the spool 42 are arranged coaxially with the drive shaft 15. The spool 42 has a hole 42*a* that penetrates in the axial direction of the spool 42. The iron core 43 and the return spring 44 are inserted into the hole 42*a* of the spool 42. The yoke 45 is connected to the iron core 43.

The yoke 45 includes a first yoke 45*a* and a second yoke 45*b*. The first yoke 45*a* is arranged between the contact device 3 and the spool 42. The second yoke 45*b* is connected to the first yoke 45*a*. The second yoke 45*b* has a U-shape. The second yoke 45*b* is arranged on both sides of the coil 41 and on the opposite side of the first yoke 45*a* with respect to the coil 41.

The iron core 43 includes a fixed iron core 43*a*, a movable iron core 43*b*, and a ring iron core 43*c*. The fixed iron core 43*a* is fixed to the second yoke 45*b*. The ring iron core 43*c* is in contact with the first yoke 45*a*. The movable iron core 43*b* is separate from the fixed iron core 43*a* and the ring iron core 43*c*. The movable iron core 43*b* is movably arranged in the contact direction Z1 and the separating direction Z2. The movable iron core 43*b* moves within the ring iron core 43*c*. The movable iron core 43*b* is connected to the drive shaft 15. The return spring 44 is arranged between the movable iron core 43*b* and the fixed iron core 43*a*. The return spring 44 biases the movable iron core 43*b* in the separating direction Z2.

Next, the operation of the relay 1 will be described. When the coil 41 is not excited due to no electric current being passed therethrough, the drive shaft 15 is in a pressed state in the separating direction Z2 by the elastic force of the return spring 44 together with the movable iron core 43*b*. Therefore, the movable contact piece 7 is also in a pressed state in the separating direction Z2, and as shown in FIG. 1, the first movable contact 13 and the second movable contact 14 assume an open state separated from the first fixed contact 11 and the second fixed contact 12.

When the coil 41 is excited by an electric current being passed therethrough, the movable iron core 43*b* moves in the contact direction Z1 against the elastic force of the return spring 44 due to the electromagnetic force of the coil 41. Thereby, the drive shaft 15, the holder 16, and the movable contact piece 7 all move in the contact direction Z1, whereby the first movable contact 13 and the second movable contact 14 assume a closed state in contact with the first fixed contact 11 and the second fixed contact 12.

When the electric current to the coil 41 is stopped and the coil 41 is demagnetized, the drive shaft 15 is pressed in the separating direction Z2 by the elastic force of the return spring 44 together with the movable iron core 43*b*. For that reason, the movable contact piece 7 is also pressed in the separating direction Z2, whereby the first movable contact 13 and the second movable contact 14 return to the open state.

Figure 2:
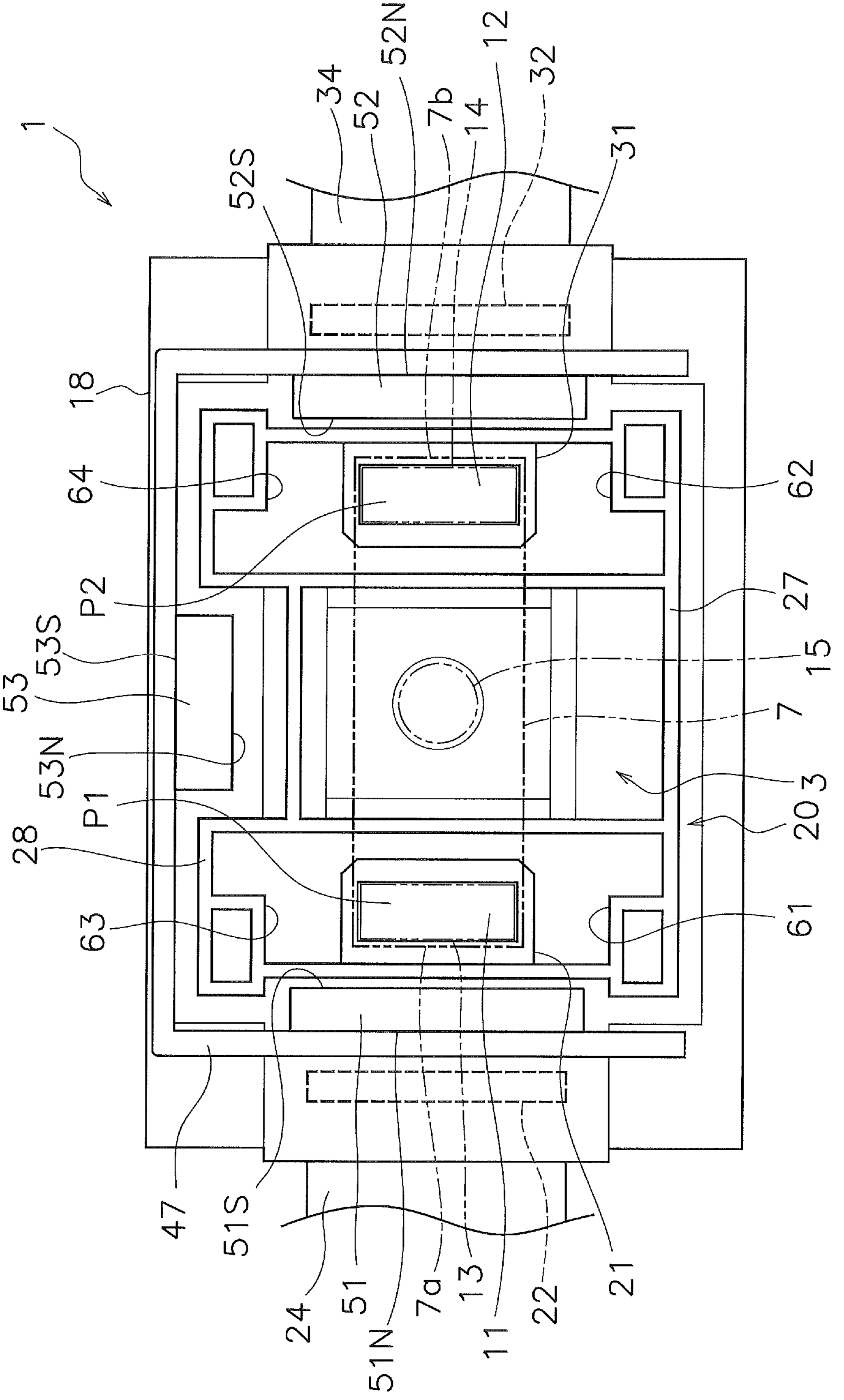
FIG. 2 is a plan view showing a configuration inside a contact case of a relay.

FIG. 2 is a plan view showing a configuration of the relay 1 in the contact case 18. In FIG. 2, the positions of the movable contact piece 7 and the drive shaft 15 are indicated by a dashed line. As shown in FIGS. 1 and 2, the relay 1 includes a first magnet 51, a second magnet 52, and a third magnet 53. The first magnet 51, the second magnet 52, and the third magnet 53 are permanent magnets for extinguishing an arc generated between the contacts.

The first magnet 51 and the second magnet 52 are arranged apart from each other in the left-right direction. The first magnet 51 is arranged on one side of the movable contact piece 7 in the left-right direction. The second magnet 52 is arranged on one side of the movable contact piece 7 in the left-right direction. Specifically, the first magnet 51 is arranged to the left of the movable contact piece 7. The second magnet 52 is arranged to the right of the movable contact piece 7.

The first magnet 51 and the second magnet 52 are arranged so that their same poles face each other. Specifically, the first magnet 51 includes an S-pole surface 51S that opposes the movable contact piece 7 and an N-pole surface 51N on the opposite side of the S-pole surface 51S. The second magnet 52 includes an S-pole surface 52S opposing the movable contact piece 7 and an N-pole surface 52N on the opposite side of the S-pole surface 52S.

The third magnet 53 is arranged opposite the front-back direction with respect to the movable contact piece 7. In the present embodiment, the front-back direction coincides with the width direction of the movable contact piece 7 that intersects the longitudinal direction of the movable contact piece 7. The third magnet 53 includes an N-pole surface 53N opposing the movable contact piece 7 and an S-pole surface 53S on the opposite side of the N-pole surface 53N.

The relay 1 includes a yoke 47. The yoke 47 connects the first magnet 51, the second magnet 52, and the third magnet 53. Specifically, the yoke 47 is connected to the N-pole surface 51N of the first magnet 51, the N-pole surface 52N of the second magnet 52, and the S-pole surface 53S of the third magnet 53.

Figure 3:
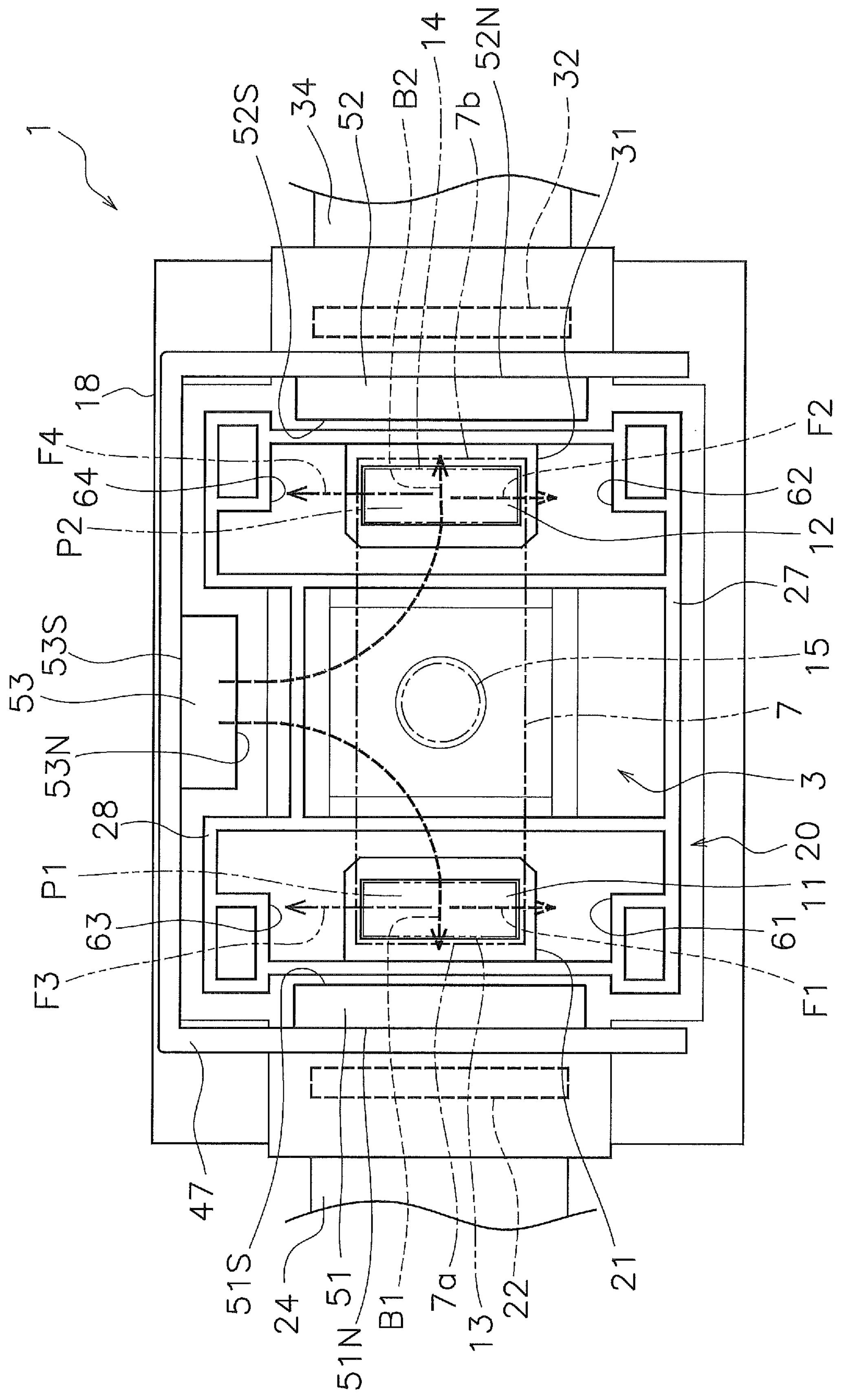
FIG. 3 is a plan view showing a configuration inside a contact case of a relay.

Due to the arrangement of the first magnet 51, the second magnet 52, and the third magnet 53 as described above, as shown in FIG. 3, a magnetic flux B1 heading to the outer side in the left-right direction is generated at a position between the first fixed contact 11 and the first movable contact 13 (hereinafter referred to as "first contact position P1"). Further, a magnetic flux B2 heading to the outer side in the left-right direction is generated at a position between the second fixed contact 12 and the second movable contact 14 (hereinafter referred to as "second contact position P2"). Specifically, the magnetic flux B1 in the direction from the center in the left-right direction to the first end portion 7*a* is generated between the first fixed contact 11 and the first movable contact 13. The magnetic flux B2 in the direction from the center in the left-right direction to the second end portion 7*b* is generated between the second fixed contact 12 and the second movable contact 14.

Accordingly, when an electric current flows from the first movable contact 13 to the second movable contact 14 (from left to right in FIG. 3) in the movable contact piece 7, a Lorentz force indicated by the arrow F1 acts at the first contact position P1. Further, a Lorentz force indicated by the arrow F2 acts at the second contact position P2. When an electric current flows from the second movable contact 14 to the first movable contact 13 (from right to left in FIG. 3) in the movable contact piece 7, a Lorentz force indicated by the arrow F3 acts at the first contact position P1. Further, a Lorentz force indicated by the arrow F4 acts at the second contact position P2.

As described above, when the Lorentz forces F1 and F2 or the Lorentz forces F3 and F4 act on an arc, the arc is stretched in the directions indicated by the arrows F1-F4. Thereby, the arc is quickly extinguished. Hereinafter, the direction of the Lorentz force (F1-F4) acting on the arc by the magnetic force of the first to third magnets 51-53 is referred to as the "first extension direction (F1-F4)". In the present embodiment, the first extension direction (F1-F4) is the width direction of the movable contact piece, that is, the front-back direction.

Specifically, the first extension direction (F1) is the direction of the Lorentz force acting on an arc at the first contact position P1 by the magnetic fields of the first to third magnets 51-53 when an electric current flows from the first movable contact 13 to the second movable contact 14 in the movable contact piece 7. The first extension direction (F2) is the direction of the Lorentz force acting on an arc at the second contact position P2 by the magnetic fields of the first to third magnets 51-53 when an electric current flows from the first movable contact 13 to the second movable contact 14 in the movable contact piece 7.

The first extension direction (F3) is the direction of the Lorentz force acting on an arc at the first contact position P1 by the magnetic fields of the first to third magnets 51-53 when an electric current flows from the second movable contact 14 to the first movable contact 13 in the movable contact piece 7. The first extension direction (F4) is the direction of the Lorentz force acting on an arc at the second contact position P2 by the magnetic fields of the first to third magnets 51-53 when an electric current flows from the second movable contact 14 to the first movable contact 13 in the movable contact piece 7.

Figure 4:
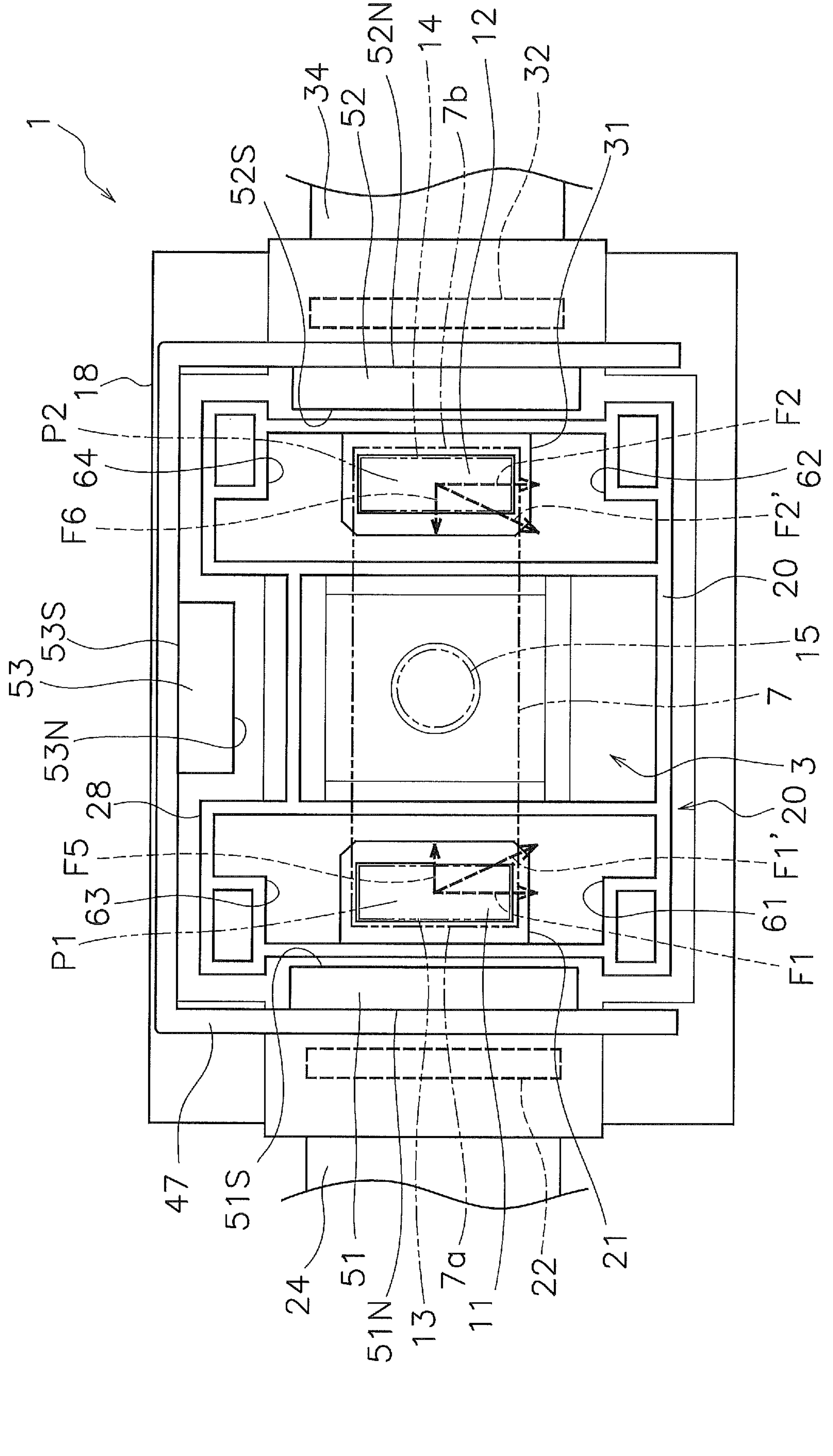
FIG. 4 is a plan view showing a configuration inside a contact case of a relay.

Further, as shown in FIG. 4, at the first contact position P1, the Lorentz force F5 due to the self-magnetic field of the first fixed terminal 5 acts on the arc. Specifically, due to the electric current flowing through the first intermediate portion 22, the Lorentz force F5 acts on the arc in a direction different from the first extension direction (F1-F4) at the first contact position P1.

For example, when an electric current flows from the first movable contact 13 to the second movable contact 14 in the movable contact piece 7, at the first contact position P1, the Lorentz force F5 heading to the inner side in the left-right direction acts on the arc due to the magnetic field generated by the electric current flowing through the first intermediate portion 22. In this case, a resultant force F1' of the Lorentz forces F1 and F5 acts on the arc. Accordingly, the arc is stretched in the direction of the resultant force F1' of the Lorentz forces.

Similarly, at the second contact position P2, an electric current flows through the second intermediate portion 32, whereby the Lorentz force F6 heading to the inner side in the left-right direction acts on the arc at the second contact position P2. Therefore, a resultant force F2' of the Lorentz forces F2 and F6 acts on the arc. Accordingly, the arc is stretched in the direction of the Lorentz force resultant force F2'.

Hereinbelow, the directions of the Lorentz forces F5 and F6 acting on the arc by the magnetic field generated by the electric current flowing in the first intermediate portion 22 are referred to as the second extension directions (F5 and F6). In the present embodiment, the second extension directions (F5, F6) are directions heading to the inner side in the longitudinal direction of the movable contact piece.

Specifically, the second extension direction (F5) is the direction of the Lorentz force acting on the arc at the first contact position P1 due to the magnetic field generated by the electric current flowing in the first intermediate portion 22. The second extension direction (F6) is the direction of the Lorentz force acting on the arc at the second contact position P2 due to the magnetic field generated by the electric current flowing through the second intermediate portion 32.

Figure 5:
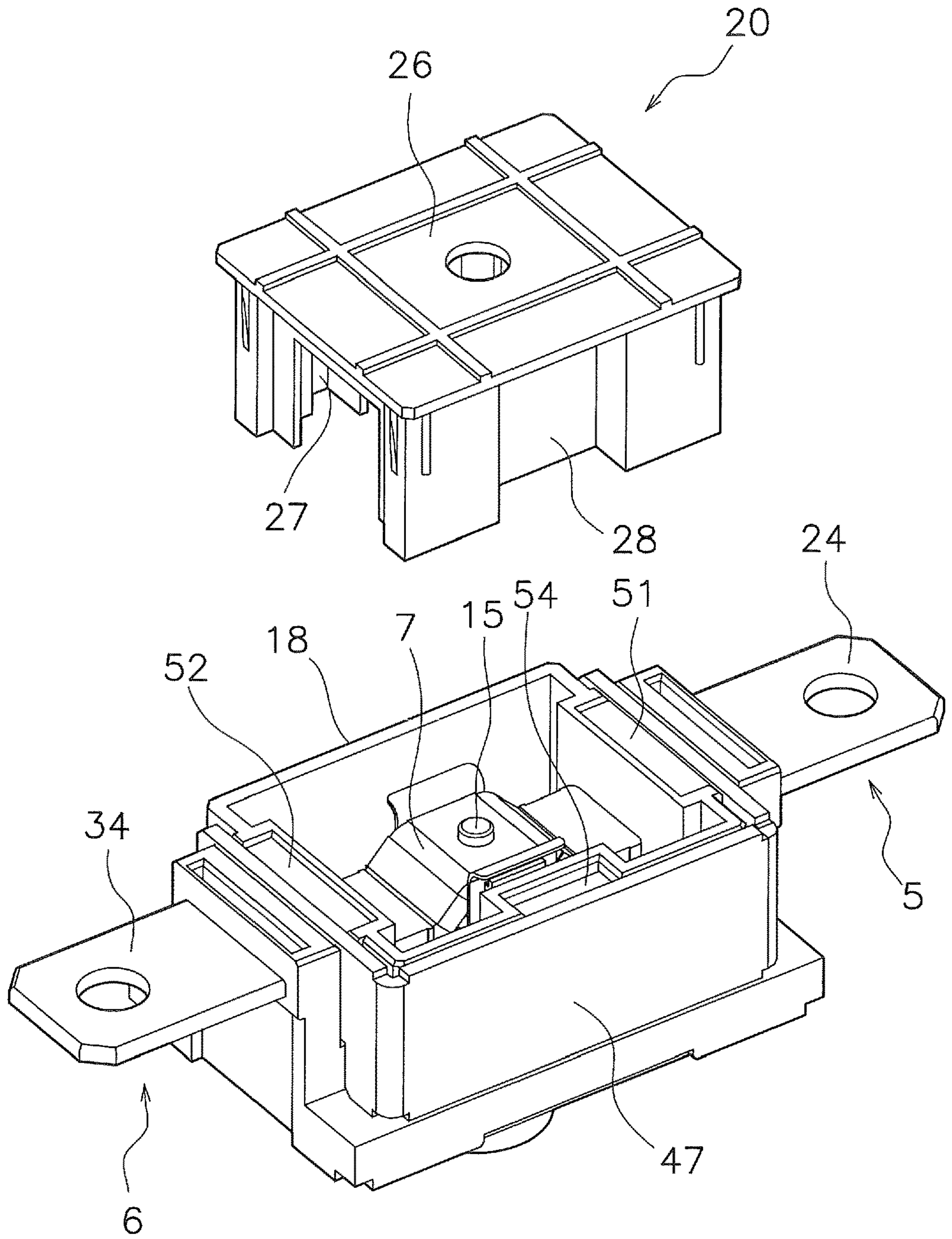
FIG. 5 is an exploded perspective view of an inner case and a contact case.
Figure 6:
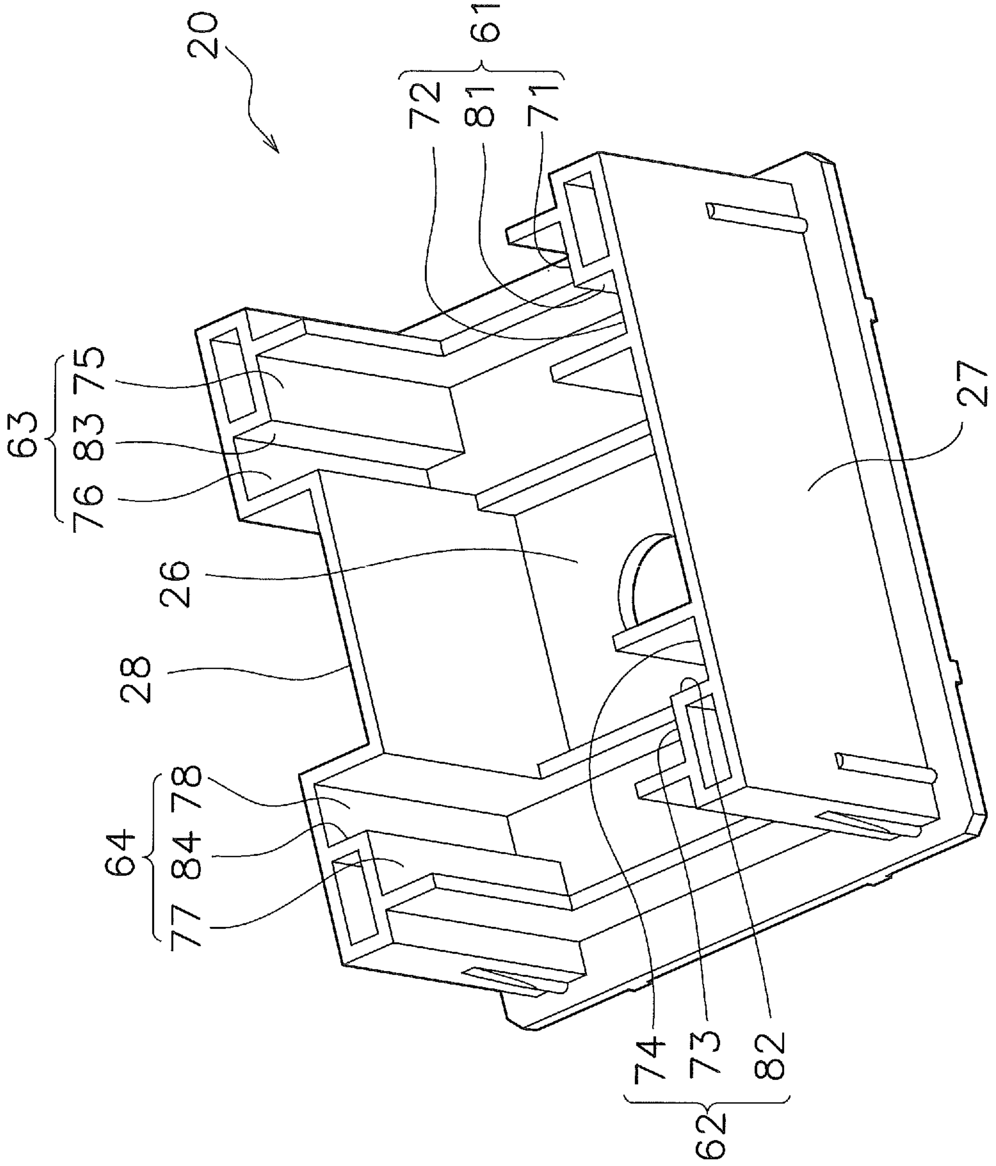
FIG. 6 is a perspective view of the inner case as viewed from below.

As shown in FIG. 2, the relay 1 includes a first wall portion 61, a second wall portion 62, a third wall portion 63, and a fourth wall portion 64 for extinguishing an arc stretched as described above. The first to fourth wall portions 61-64 are provided in the inner case 20. FIG. 5 is an exploded perspective view of the inner case 20 and the contact case 18. FIG. 6 is a perspective view of the inner case 20 as viewed from below.

As shown in FIG. 6, the inner case 20 is separate from the contact case 18. The inner case 20 is formed of an arc-extinguishing material that generates an arc-extinguishing gas by the heat of the arc. The inner case 20 may be formed of, for example, a thermosetting resin such as an unsaturated polyester resin or a melamine resin. Alternatively, the inner case 20 may be formed of a thermoplastic resin such as a polyolefin resin, a polyamide resin, or a polyacetal resin. Alternatively, the inner case 20 may be made of another arc-extinguishing material.

The inner case 20 includes a top surface 26, a first side wall 27, and a second side wall 28. The top surface 26 covers the first storage portion S1 in the contact case 18 from above. The first side wall 27 and the second side wall 28 are arranged apart from each other in the front-back direction. The first side wall 27 and the second side wall 28 extend downward from the top surface 26. The first wall portion 61 and the second wall portion 62 are located on the inner surface of the first side wall 27. The third wall portion 63 and the fourth wall portion 64 are provided on the inner surface of the second side wall 28.

Figure 7:
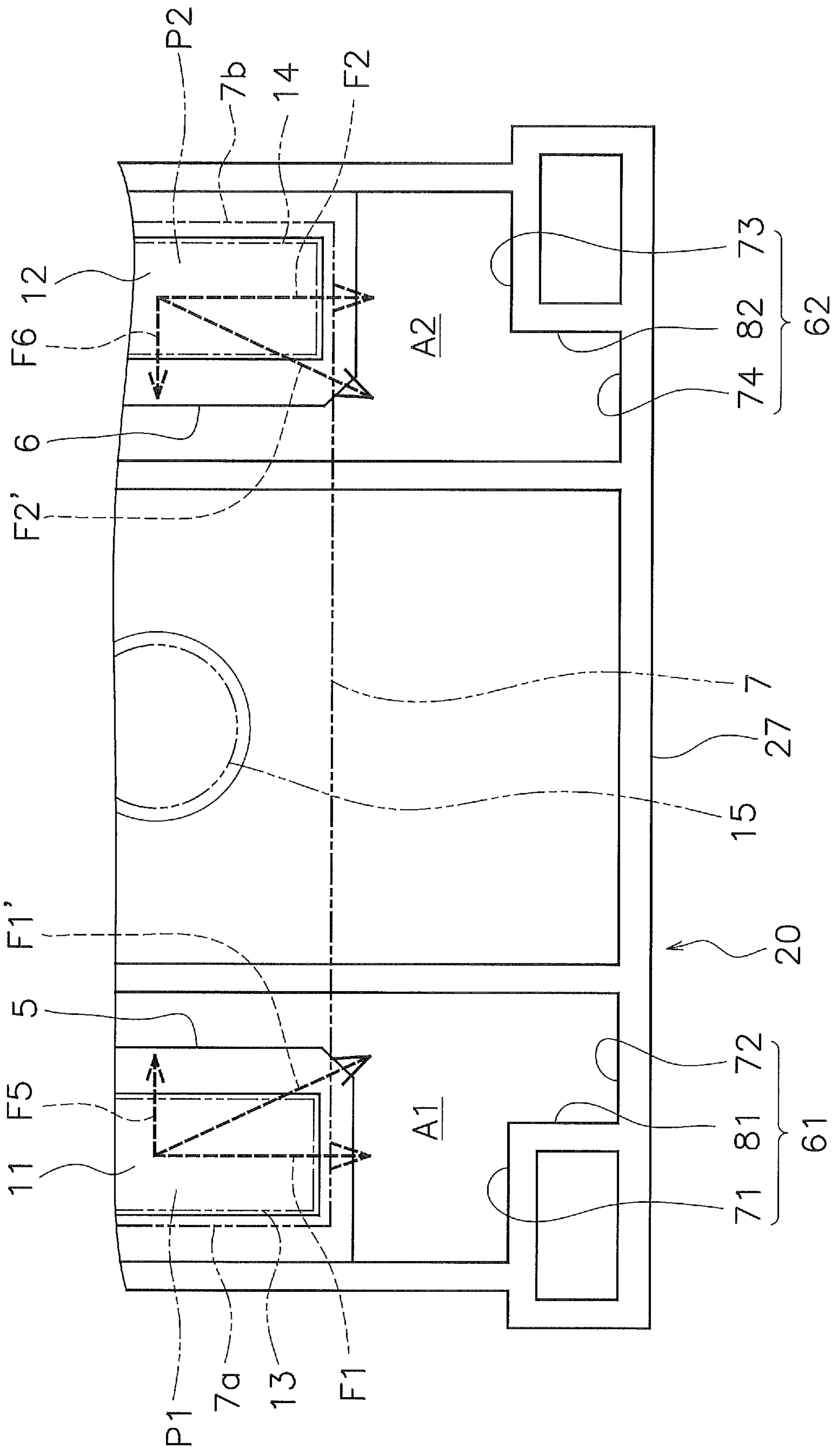
FIG. 7 is an enlarged plan view showing a structure around a first wall portion and a second wall portion.

FIG. 7 is an enlarged plan view showing the surrounding structures of the first wall portion 61 and the second wall portion 62. As shown in FIG. 7, the first wall portion 61 is arranged separated from the movable contact piece 7 in the first extension direction (F1) by the arc-extinguishing space A1. The first wall portion 61 is arranged at a position opposing the first contact position P1 in the first extension direction (F1). The first wall portion 61 includes a first wall surface 71, a second wall surface 72, and a first connecting wall surface 81.

The first wall surface 71 is arranged facing the arc-extinguishing space A1. The first wall surface 71 is arranged opposite the first extension direction (F1) with respect to the first movable contact 13 and the first fixed contact 11. That is, when viewed from the front-back direction, the first wall surface 71 overlaps the first movable contact 13 and the first fixed contact 11. The first wall surface 71 has a flat shape extending in the left-right direction.

The second wall surface 72 is arranged facing the arc-extinguishing space A1. The second wall surface 72 is arranged in the second extension direction (F5) with respect to the first wall surface 71. The second wall surface 72 is arranged opposite the first extension direction (F1) with respect to the first movable contact 13 and the first fixed contact 11. That is, when viewed from the front-back direction, the second wall surface 72 overlaps the first movable contact 13 and the first fixed contact 11.

The second wall surface 72 has a flat shape extending in the left-right direction. The second wall surface 72 is arranged farther from the movable contact piece 7 than the first wall surface 71 in the first extension direction (F1). Therefore, in the first extension direction (F1), the distance from the movable contact piece 7 to the second wall surface 72 is larger than the distance from the movable contact piece 7 to the first wall surface 71.

The first connecting wall surface 81 is arranged between the first wall surface 71 and the second wall surface 72. The first connecting wall surface 81 is connected to the first wall surface 71 and the second wall surface 72. The first connecting wall surface 81 extends in the front-back direction, that is, in the first extension direction (F1). The first wall portion 61 has a stepped shape on the first connecting wall surface 81.

The second wall portion 62 has a shape symmetrical to the first wall portion 61 in the left-right direction. The second wall portion 62 is arranged separated from the movable contact piece 7 in the first extension direction (F2) by the arc-extinguishing space A2. The second wall portion 62 is arranged at a position opposing the second contact position P2 in the first extension direction (F2). The second wall portion 62 includes a third wall surface 73, a fourth wall surface 74, and a second connecting wall surface 82. The fourth wall surface 74 is arranged apart from the movable contact piece 7 with respect to the third wall surface 73 in the first extension direction (F2). The third wall surface 73, the fourth wall surface 74, and the second connecting wall surface 82 are symmetrical in the left-right direction with the first wall surface 71, the second wall surface 72, and the first connecting wall surface 81, respectively, and thereby detailed descriptions thereof are omitted.

Figure 8:
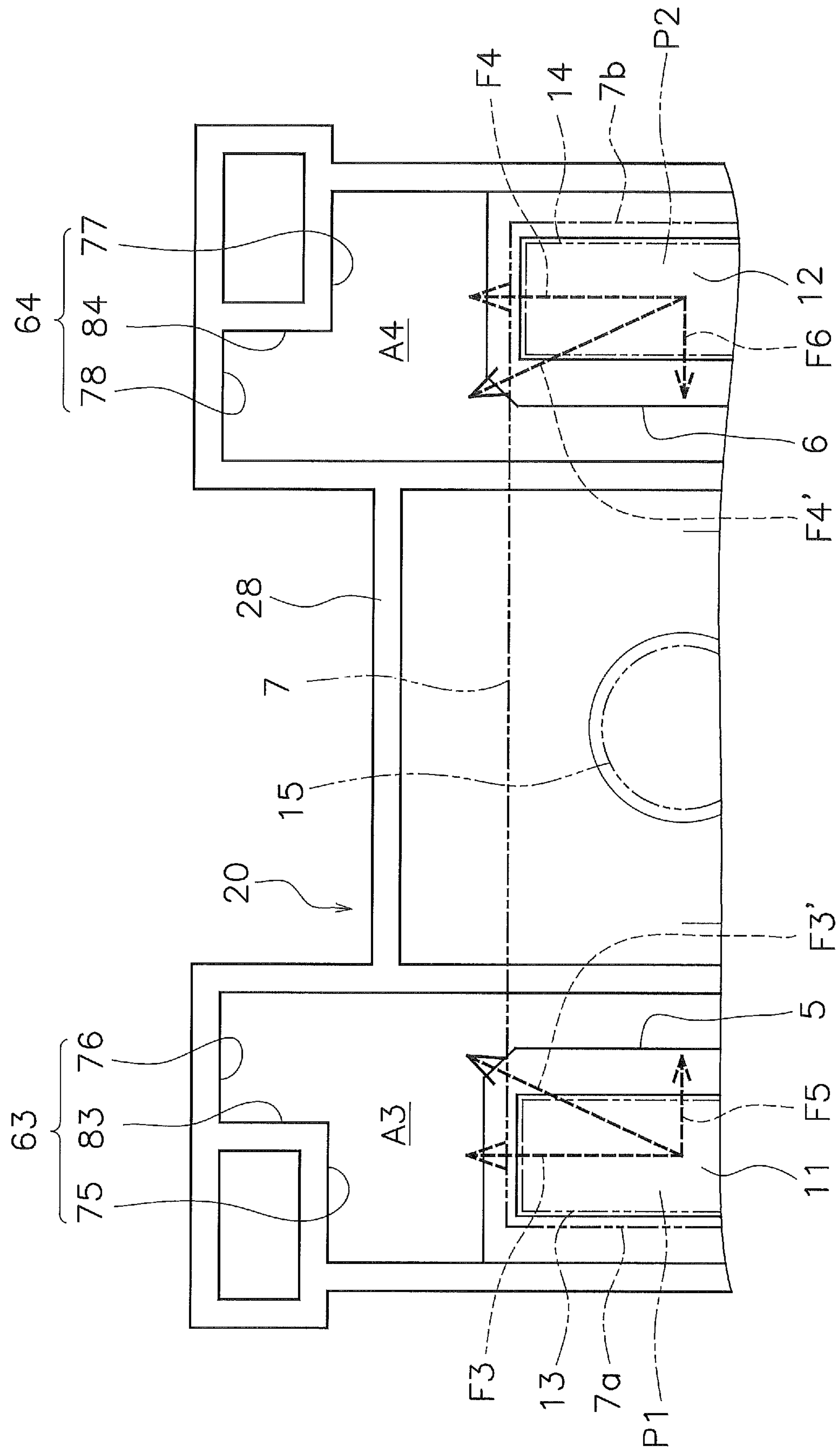
FIG. 8 is an enlarged plan view showing a structure around a third wall portion and a fourth wall portion.

FIG. 8 is an enlarged plan view showing the surrounding structures of the third wall portion 63 and the fourth wall portion 64. The third wall portion 63 has a shape symmetrical with that of the first wall portion 61 in the front-back direction. As shown in FIG. 8, the third wall portion 63 is arranged separated from the movable contact piece 7 in the first extension direction (F3) by the arc-extinguishing space A3. The third wall portion 63 includes a fifth wall surface 75, a sixth wall surface 76, and a third connecting wall surface 83. The sixth wall surface 76 is arranged apart from the movable contact piece 7 with respect to the fifth wall surface 75 in the first extension direction (F3). Because the fifth wall surface 75, the sixth wall surface 76, and the third connecting wall surface 83 are symmetrical in the front-back direction with the first wall surface 71, the second wall surface 72, and the first connecting wall surface 81, respectively, detailed descriptions thereof are omitted.

The fourth wall portion 64 has a shape symmetrical to the third wall portion 63 in the left-right direction. The fourth wall portion 64 is arranged separated from the movable contact piece 7 in the first extension direction (F4) by the arc-extinguishing space A4. The fourth wall portion 64 includes a seventh wall surface 77, an eighth wall surface 78, and a fourth connecting wall surface 84. The eighth wall surface 78 is arranged farther from the movable contact piece 7 than the seventh wall surface 77 in the first extension direction (F4). Because the seventh wall surface 77, the eighth wall surface 78, and the fourth connecting wall surface 84 are symmetrical in the left-right direction with the fifth wall surface 75, the sixth wall surface 76, and the third connecting wall surface 83, respectively, detailed descriptions thereof are omitted.

Figure 9:
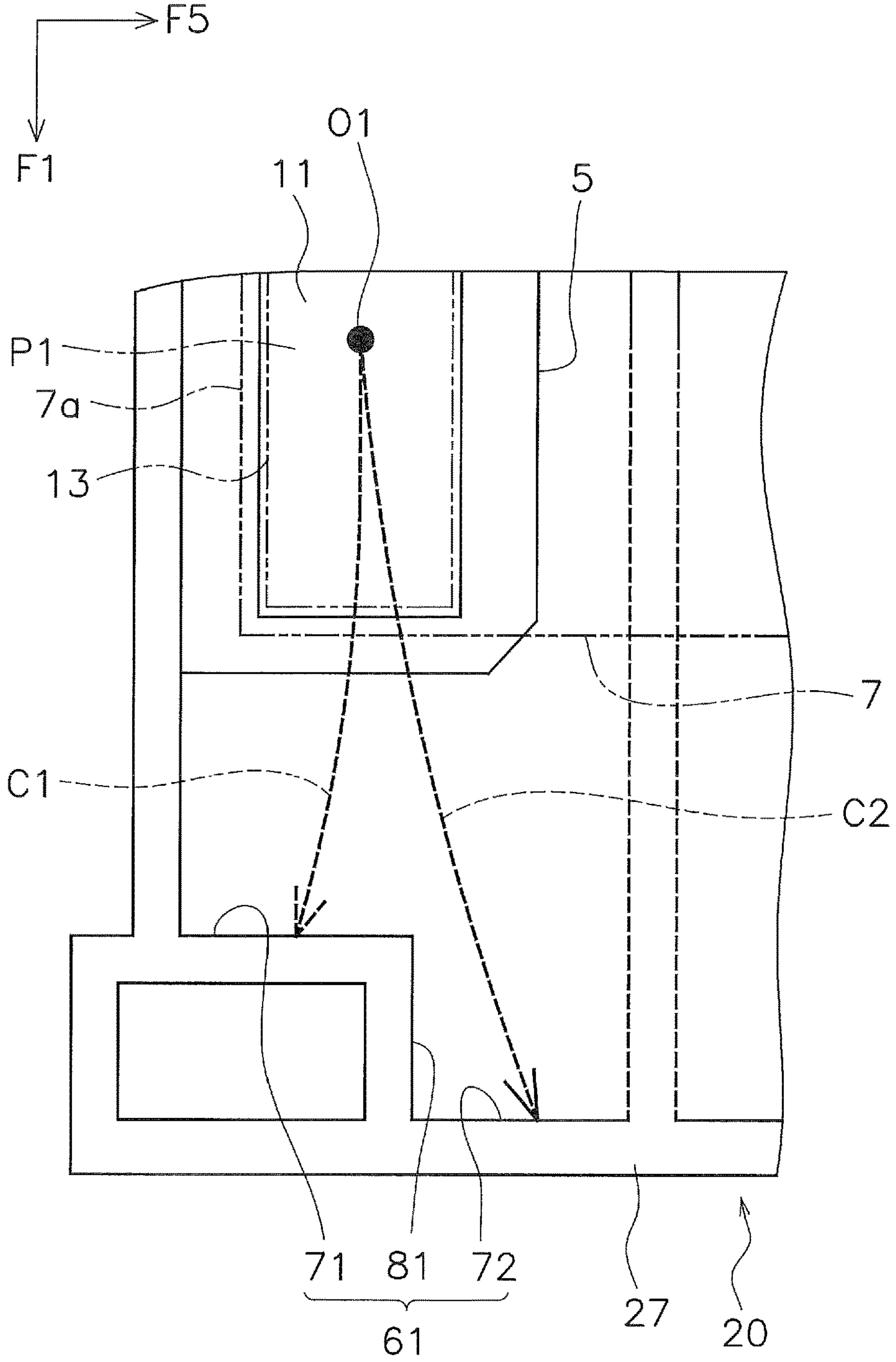
FIG. 9 is an enlarged view of the periphery of the first wall portion.

In the relay 1 according to the first embodiment described above, when the electric current flowing through the contacts is small, the arc is stretched toward the first wall surface 71. Further, when the electric current flowing through the contacts is large, the arc is stretched toward the second wall surface 72. FIG. 9 is an enlarged view of the periphery of the first wall portion 61. For example, when the electric current flowing through the contacts is 100 A, the Lorentz force F5 in the second extension direction (F5) is smaller than the Lorentz force F1 in the first extension direction (F1). For that reason, the arc is stretched from the starting point O1 of the arc in the direction indicated by the arrow C1 in FIG. 9. Thereby, the arc is stretched toward the first wall surface 71.

The starting point O1 of the arc shown in FIG. 9 is the center of the contact portion between the first fixed contact 11 and the first movable contact 13. However, the starting point O1 of the arc is not limited to the center of the contact portion between the first fixed contact 11 and the first movable contact 13, and may be at another position.

For example, when the electric current flowing through the contacts is 3000 A, the Lorentz force F5 in the second extension direction (F5) is larger than when the electric current is 100 A. Therefore, the arc is stretched from the starting point O1 of the arc in the direction indicated by the arrow C2 in FIG. 9. Thereby, the arc is stretched toward the second wall surface 72.

Here, the distance from the movable contact piece 7 to the second wall surface 72 is larger than the distance from the movable contact piece 7 to the first wall surface 71. For that reason, when the electric current is large, a space sufficiently large for stretching the arc can be secured between the second wall surface 72 and the movable contact piece 7.

In other words, the distance from the movable contact piece 7 to the first wall surface 71 is smaller than the distance from the movable contact piece 7 to the second wall surface 72. Therefore, even if the electric current is small, the stretched arc can be pressed against the first wall surface 71 with sufficient force. Thereby, the arc can be extinguished appropriately.

As described above, in the relay 1 according to the present embodiment, it is possible to appropriately extinguish an arc in accordance with the magnitude of the electric current flowing through the contacts by appropriately setting the positions of the first wall surface 71 and the second wall surface 72 of the first wall portion 61 with respect to the movable contact piece 7.

The first wall portion 61 is provided in the inner case 20 which is separate from the contact case 18. Accordingly, the formation of the first wall portion 61 becomes easy.

The first wall portion 61 is formed of an arc-extinguishing material that generates an arc-extinguishing gas by the heat of the arc. Therefore, when the arc is pressed against the first wall portion 61 with a sufficient force, the arc can be extinguished more appropriately.

Further, the same effect as that of the first wall portion 61 described above can be obtained for the second to fourth wall portions 62-64.

Although the embodiments of the present invention have been described above, the present invention is not limited to the above embodiments, and various modifications can be made without departing from the gist of the invention. For example, the configuration of the drive device 4 may be changed. The shape or arrangement of the coil 41, the spool 42, the iron core 43, the return spring 44, or the yoke 45 may be changed. The shape or arrangement of the case 2 may be changed.

The shape or arrangement of the first fixed terminal 5, the second fixed terminal 6, and the movable contact piece 7 may be changed. For example, the first external connection portion 24 and the second external connection portion 34 may project upward from the case 2. Alternatively, the first external connection portion 24 and the second external connection portion 34 may protrude from the case 2 in the front-back direction. The arrangement or polarity of the first to third magnets 51-53 is not limited to that of the above embodiment, and may be changed.

The first fixed contact 11 may be separate from the first fixed terminal 5 or may be integrated therewith. The second fixed contact 12 may be separate from the second fixed terminal 6 or may be integrated therewith. The first movable contact 13 may be separate from the movable contact piece 7 or may be integrated therewith. The second movable contact 14 may be separate from the movable contact piece 7 or may be integrated therewith.

In the above embodiment, the drive device 4 pulls the drive shaft 15 from the coil 41 side, whereby the movable contact piece 7 moves in the contact direction Z1. Further, when the drive device 4 pushes the drive shaft 15 from the coil 41 side, the movable contact piece 7 moves in the separating direction Z2. However, the operating direction of the drive shaft 15 for opening and closing the contacts may be opposite to that of the above embodiment. That is, the movable contact piece 7 may move in the separating direction Z2 by the drive device 4 pulling the drive shaft 15 to the coil 41 side. The movable contact piece 7 may move in the contact direction Z1 by the drive device 4 pushing the drive shaft 15 from the coil 41 side. That is, the contact direction Z1 and the separating direction Z2 may be turned upside down from the above-described embodiment.

The shape or arrangement of the first to fourth wall portions 61-64 may be changed. The shape or arrangement of the first to eighth wall surfaces 71-78 may be changed. The shape or arrangement of the first to fourth connecting wall surfaces 81-84 may be changed. For example, in the above embodiment, the first to fourth wall portions 61-64 are integrally provided on the inner case 20. However, the first to fourth wall portions 61-64 may be separate bodies from each other. The first to fourth wall portions 61-64 may be provided separately from the inner case 20. A part of the first to fourth wall portions 61-64 may be omitted.

Figure 10:
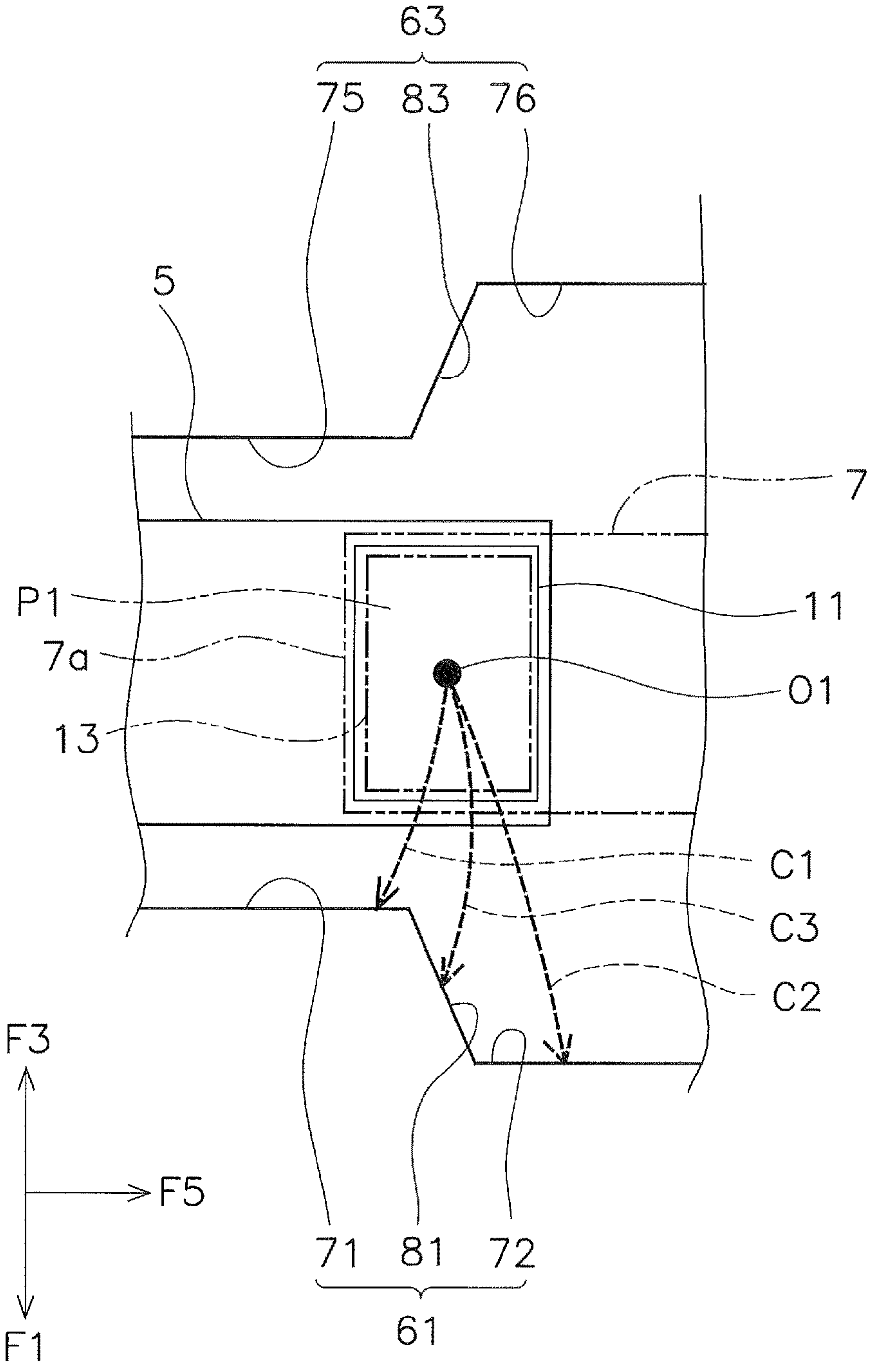
FIG. 10 is a schematic view showing a first wall portion according to a first modification.

FIG. 10 is a schematic view showing the first wall portion 61 according to a first modification. As shown in FIG. 10, the first connecting wall surface 81 may be inclined so that the distance from the movable contact piece 7 increases toward the second extension direction (F5). In this case, as shown by the arrow C3 in FIG. 10, when the arc is stretched between the first wall surface 71 and the second wall surface 72, the arc can be appropriately extinguished.

Figure 11:
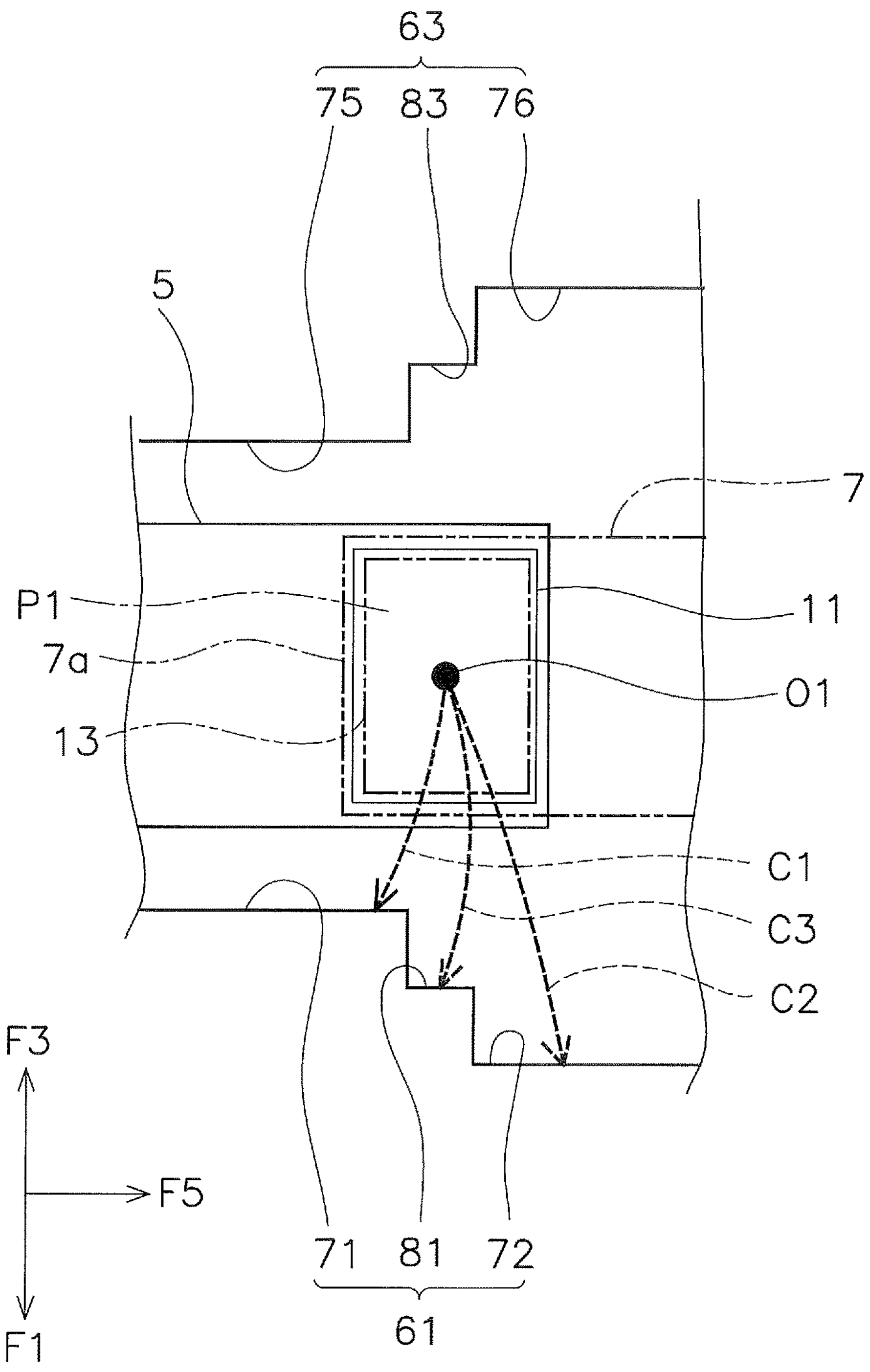
FIG. 11 is a schematic view showing a first wall portion according to a second modification.

FIG. 11 is a schematic view showing the first wall portion 61 according to the second modification. As shown in FIG. 11, the first connecting wall surface 81 may extend in the second extension direction (F5) in the same manner as the first wall surface 71 and the second wall surface 72. The first connecting wall surface 81 may be arranged between the first wall surface 71 and the second wall surface 72 in the first extension direction (F1).

The first wall portion 61 may have a plurality of stepped shapes due to the first wall surface 71, the first connecting wall surface 81, and the second wall surface 72. As for the first connecting wall surface 81, the distance from the movable contact piece 7 to the first connecting wall surface 81 may be larger than the distance from the movable contact piece 7 to the first wall surface 71, and may be smaller than the distance from the movable contact piece 7 to the second wall surface 72. In this case, as shown by the arrow C3, when the arc is stretched between the first wall surface 71 and the second wall surface 72, the arc can be appropriately extinguished.

Figure 12:
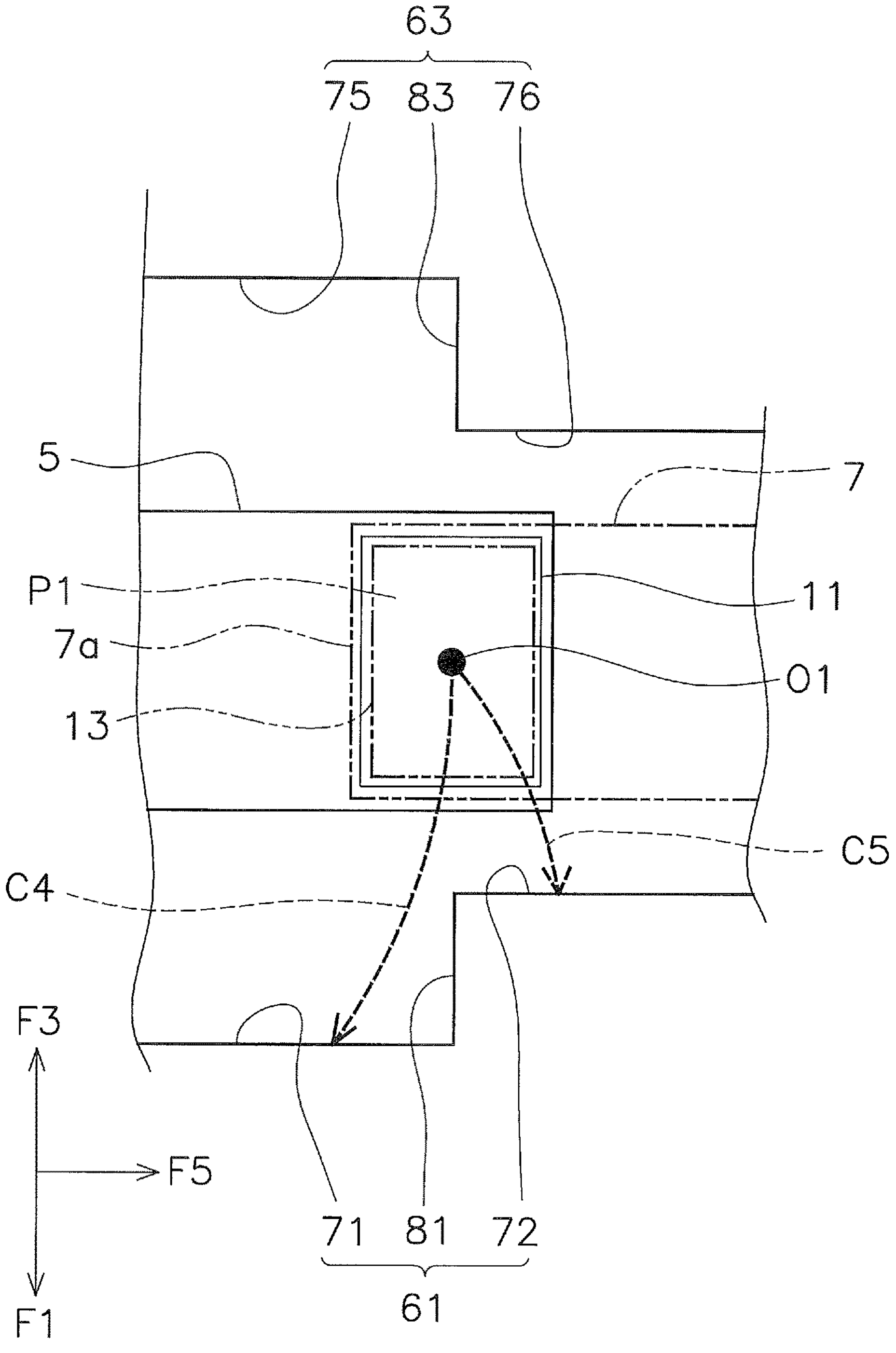
FIG. 12 is a schematic view showing a first wall portion according to a third modification.

FIG. 12 is a schematic view showing the first wall portion 61 according to the third modification. As shown in FIG. 12, the distance from the movable contact piece 7 to the second wall surface 72 may be smaller than the distance from the movable contact piece 7 to the first wall surface 71. That is, in the first extension direction (F1), the second wall surface 72 may be arranged closer to the movable contact piece 7 than the first wall surface 71.

In this case, when the electric current is large but the voltage is small, the stretched arc can be pressed against the second wall surface 72 with sufficient force. For example, when an electric current of 800 V and 400 A flows through the contacts, the Lorentz force F5 in the second extension direction is smaller than the Lorentz force F1 in the first extension direction. For that reason, the arc is stretched from the starting point 01 of the arc in the direction indicated by the arrow C4 in FIG. 12. Thereby, the arc is stretched toward the first wall surface 71.

For example, when an electric current of 400 V and 3,500 A flows through the contacts, the Lorentz force F5 in the second extension direction is larger than when the electric current is 400 A. For that reason, the arc is stretched from the starting point 01 of the arc in the direction indicated by the arrow C5 in FIG. 12. Thereby, the arc is stretched toward the second wall surface 72. However, in the first extension direction, the second wall surface 72 is arranged closer to the movable contact piece 7 than the first wall surface 71. Therefore, even if the voltage is small, the stretched arc can be pressed against the second wall surface 72 with sufficient force. Thereby, the arc can be appropriately extinguished.

Figure 13:
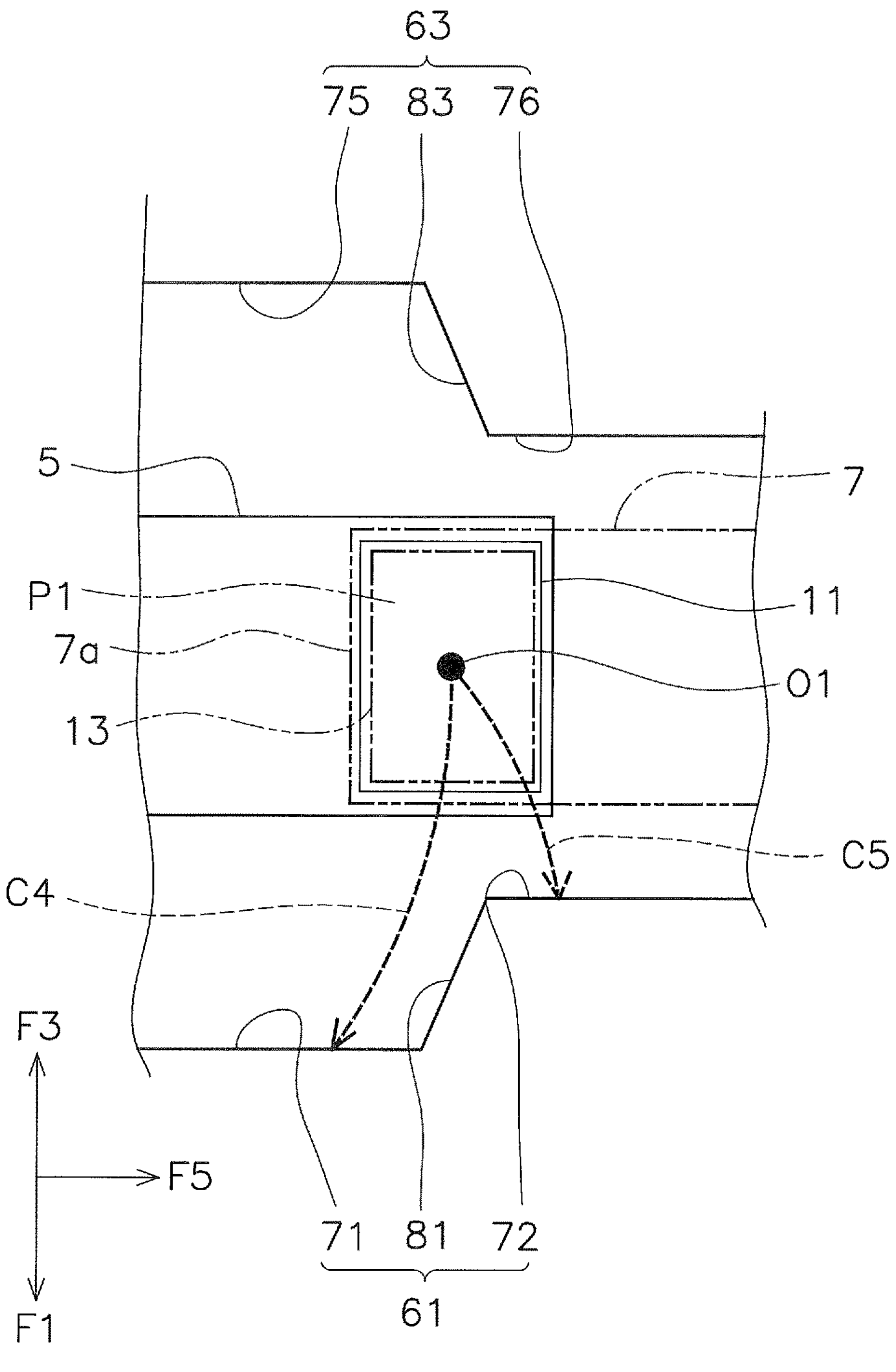
FIG. 13 is a schematic view showing a first wall portion according to a fourth modification.

FIG. 13 is a schematic view showing the first wall portion 61 according to the fourth modification. As shown in FIG. 13, the first connecting wall surface 81 may be inclined so that the distance from the movable contact piece 7 becomes smaller toward the second extension direction (F5).

Figure 14:
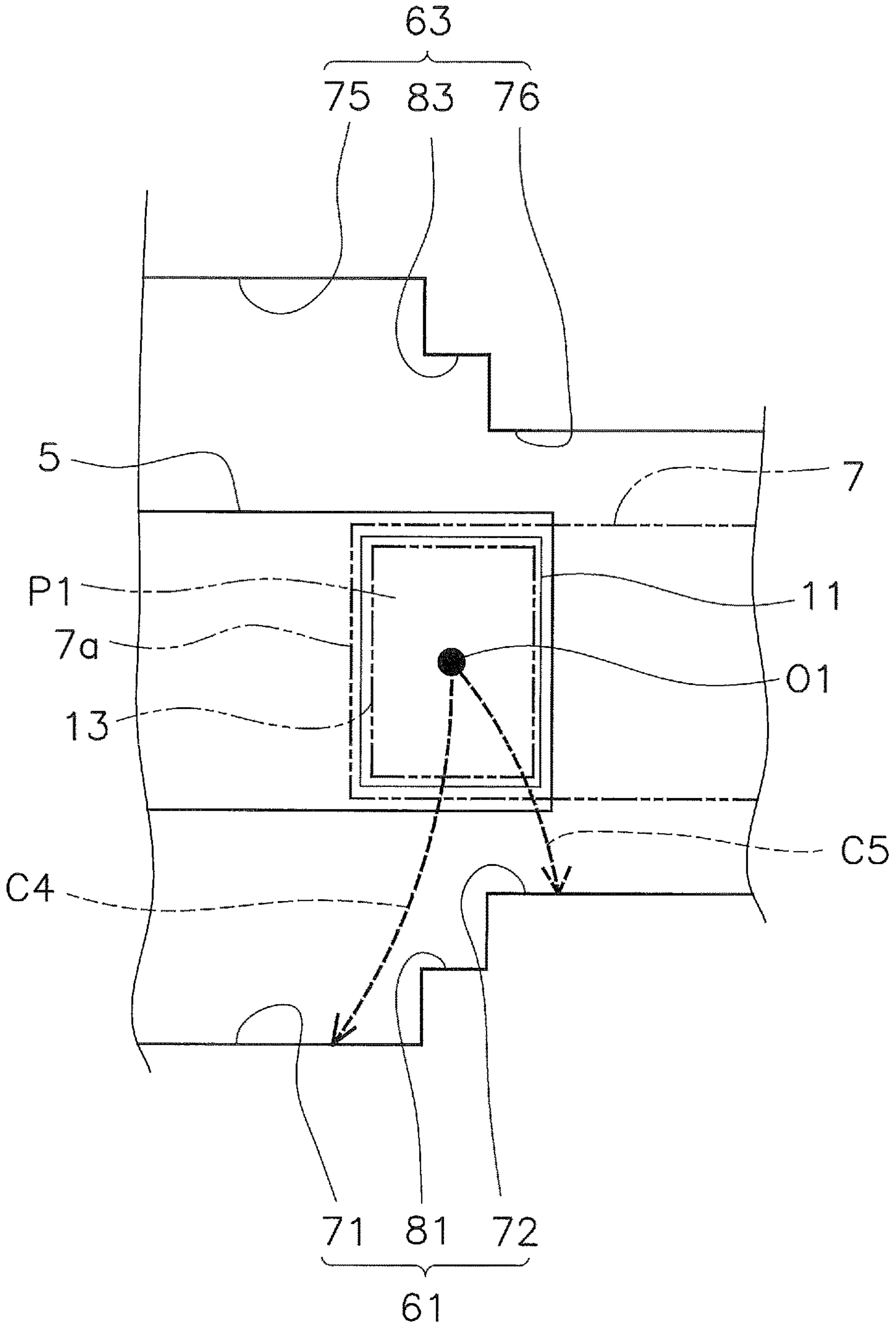
FIG. 14 is a schematic view showing a first wall portion according to a fifth modification.
Figure 15A:
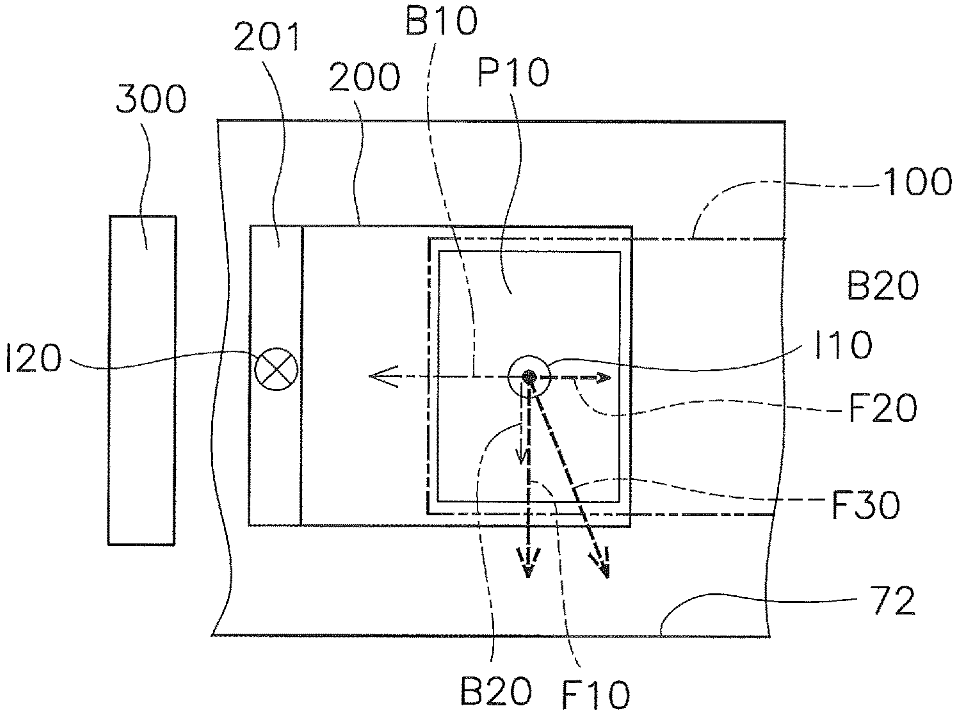
FIG. 15A is a plan view showing a configuration of a relay according to a related technique.
Figure 15B:
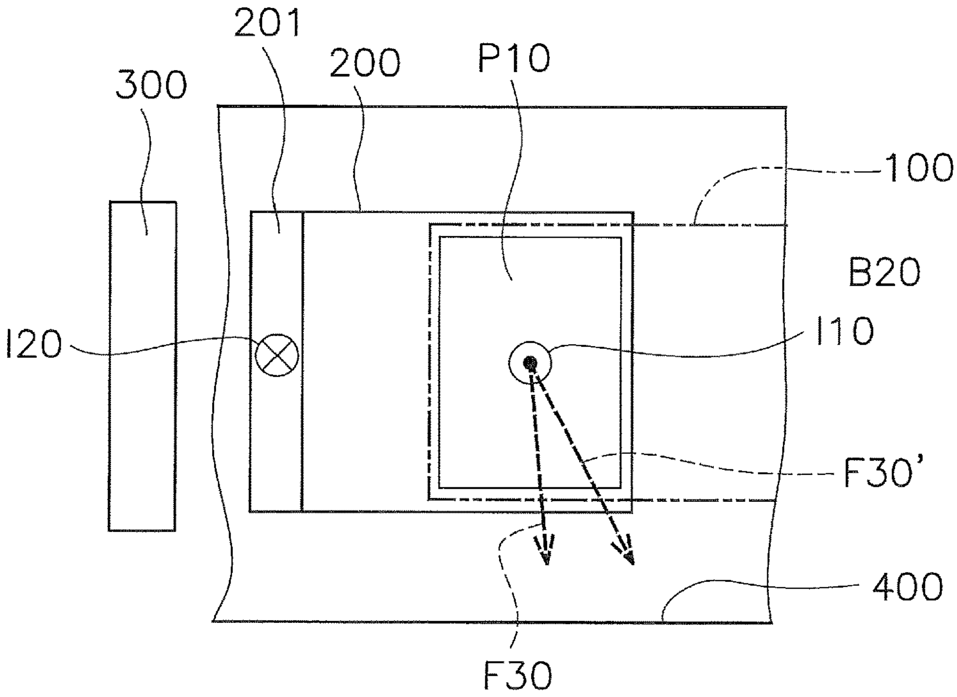
FIG. 15B is a plan view showing a configuration of a relay according to a related technique.

FIG. 14 is a schematic view showing the first wall portion 61 according to the fifth modification. As shown in FIG. 14, the distance from the movable contact piece 7 to the first connecting wall surface 81 may be larger than the distance from the movable contact piece 7 to the second wall surface 72, and may be smaller the distance from the movable contact piece 7 to the first wall surface 71.

Although modifications of the first wall portion 61 have been described above, the second to fourth wall portions 62-64 may be modified in the same manner as the aforementioned modifications.

REFERENCE NUMERALS

4 Drive device
5 First fixed terminal
7 Movable contact piece
11 First fixed contact
13 First movable contact
18 Contact case
21 First contact support portion
22 First intermediate portion
51 First magnet
61 First wall portion
71 First wall surface
72 Second wall surface
81 First connecting wall surface
A1 Arc-extinguishing space
F1 First extension direction
F5 Second extension direction

The invention claimed is:

1. A relay, comprising:

a movable contact piece extending in a longitudinal direction and having a longitudinal center, the movable contact piece including a first movable contact;

a fixed contact disposed opposite to the first movable contact;

a drive device configured to move the movable contact piece in a moving direction including a contact direction in which the first movable contact makes contact with the fixed contact and a separation direction in which the first movable contact is separated from the fixed contact;

a magnet for arc extinguishing, the magnet being arranged so as to apply a Lorentz force in a first extension direction to an arc generated between the first movable contact and the fixed contact;

a fixed terminal including a contact support portion configured to mount the fixed contact thereon, and an intermediate portion configured to apply a Lorentz force to the arc in a second extension direction different from the first extension direction when an electric current flows; and a wall portion disposed apart from the movable contact piece in the first extension direction by an arc-extinguishing space, wherein the wall portion includes 1) a first wall surface disposed to face the arc-extinguishing space and disposed opposite to the first movable contact and the fixed contact in the first extension direction, and 2) a second wall surface disposed to face the arc-extinguishing space and disposed downstream in the second extension direction with respect to the first wall surface, a first distance from the movable contact piece to the first wall surface differing from a second distance from the movable contact piece to the second wall surface, the second distance from the movable contact piece to the second wall surface is larger than the first distance from the movable contact piece to the first wall surface, the first extension direction is a width direction of the movable contact piece intersecting the longitudinal direction of the movable contact piece, and the second extension direction is a direction toward the longitudinal center of the movable contact piece in the longitudinal direction of the movable contact piece.

2. The relay according to claim 1, wherein the wall portion includes a connecting wall surface disposed between the first wall surface and the second wall surface, and a third distance from the movable contact piece to the connecting wall surface is smaller than the second distance from the movable contact piece to the second wall surface and larger than the first distance from the movable contact piece to the first wall surface.

3. The relay according to claim 1, wherein the movable contact piece further includes a second movable contact with the first movable contact and the second movable contact being disposed apart from each other in the longitudinal direction of the movable contact piece, the magnet is arranged so as to generate a magnetic flux between the first movable contact and the fixed contact in a direction toward an outside of the movable contact piece in the longitudinal direction, and the intermediate portion is disposed outside of the fixed contact in the longitudinal direction and extends in the moving direction of the movable contact piece.

4. The relay according to claim 1, further comprising:

a contact case configured to house the movable contact piece and the fixed contact, wherein the wall portion is a separate member from the contact case.

5. The relay according to claim 1, wherein the wall portion is formed of an arc-extinguishing material that generates an arc-extinguishing gas by heat of the arc.

6. A relay, comprising:

a movable contact piece including a movable contact:

a fixed contact disposed opposite to the movable contact;

a drive device configured to move the movable contact piece in a moving direction including a contact direction in which the movable contact makes contact with the fixed contact and a separation direction in which the movable contact is separated from the fixed contact;

a magnet for arc extinguishing, the magnet being arranged so as to apply a Lorentz force in a first extension direction to an arc generated between the movable contact and the fixed contact;

a fixed terminal including a contact support portion configured to mount the fixed contact thereon, and an intermediate portion configured to apply a Lorentz force to the arc in a second extension direction different from the first extension direction when an electric current flows; and a wall portion disposed apart from the movable contact piece in the first extension direction by an arc-extinguishing space, wherein the wall portion includes 1) a first wall surface disposed to face the arc-extinguishing space and disposed opposite to the movable contact and the fixed contact in the first extension direction, and 2) a second wall surface disposed to face the arc-extinguishing space and disposed downstream in the second extension direction with respect to the first wall surface, a first distance from the movable contact piece to the first wall surface differing from a second distance from the movable contact piece to the second wall surface, the second distance from the movable contact piece to the second wall surface is larger than the first distance from the movable contact piece to the first wall surface, the wall portion includes a connecting wall surface disposed between the first wall surface and the second wall surface, and the connecting wall surface is inclined to be disposed farther from the movable contact piece in the second extension direction.

7. A relay, comprising:

a movable contact piece including a movable contact:

a fixed contact disposed opposite to the movable contact;

a drive device configured to move the movable contact piece in a moving direction including a contact direction in which the movable contact makes contact with the fixed contact and a separation direction in which the movable contact is separated from the fixed contact;

a magnet for arc extinguishing, the magnet being arranged so as to apply a Lorentz force in a first extension direction to an arc generated between the movable contact and the fixed contact;

a fixed terminal including a contact support portion configured to mount the fixed contact thereon, and an intermediate portion configured to apply a Lorentz force to the arc in a second extension direction different from the first extension direction when an electric current flows; and a wall portion disposed apart from the movable contact piece in the first extension direction by an arc-extinguishing space, wherein the wall portion includes 1) a first wall surface disposed to face the arc-extinguishing space and disposed opposite to the movable contact and the fixed contact in the first extension direction, and 2) a second wall surface disposed to face the arc-extinguishing space and disposed downstream in the second extension direction with respect to the first wall surface, a first distance from the movable contact piece to the first wall surface differing from a second distance from the movable contact piece to the second wall surface, and the second distance from the movable contact piece to the second wall surface is smaller than the first distance from the movable contact piece to the first wall surface.

8. The relay according to claim 7, wherein the wall portion includes a connecting wall surface disposed between the first wall surface and the second wall surface, and a third distance from the movable contact piece to the connecting wall surface is larger than the second distance from the movable contact piece to the second wall surface and smaller than the first distance from the movable contact piece to the first wall surface.

9. The relay according to claim 7, wherein the wall portion includes a connecting wall surface disposed between the first wall surface and the second wall surface, and the connecting wall surface is inclined to be disposed closer to the movable contact piece in the second extension direction.

* * * * *